United States Patent
Wood et al.

(10) Patent No.: US 8,665,870 B2
(45) Date of Patent: Mar. 4, 2014

(54) METHOD AND APPARATUS FOR HANDLING PUSH MESSAGES

(75) Inventors: Justin M. N. Wood, Sunnyvale, CA (US); Daniel B. Pollack, San Francisco, CA (US); Jeffrey T. Davey, San Jose, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 13/484,016

(22) Filed: May 30, 2012

(65) Prior Publication Data

US 2013/0322435 A1 Dec. 5, 2013

(51) Int. Cl.
*H04L 12/28* (2006.01)

(52) U.S. Cl.
USPC .......................................... 370/389; 370/519

(58) Field of Classification Search
USPC .................................................. 370/389, 519
See application file for complete search history.

(56) References Cited

U.S. PATENT DOCUMENTS

| 5,315,586 | A  * | 5/1994 | Charvillat ...................... 370/232 |
| 2012/0126790 | A1 * | 5/2012 | Sobotka et al. ............... 324/119 |
| 2013/0086158 | A1 * | 4/2013 | Fan et al. ...................... 709/203 |

* cited by examiner

*Primary Examiner* — Sai-Ming Chan
(74) *Attorney, Agent, or Firm* — Park, Vaughan, Fleming & Dowler LLP; Anthony P. Jones

(57) ABSTRACT

The described embodiments include a first electronic device that sends one or more dummy packets to a second electronic device to cause network hardware in a network connection between the first and second electronic devices to forward buffered push messages and/or acknowledge messages.

24 Claims, 7 Drawing Sheets

METHOD AND APPARATUS FOR HANDLING PUSH MESSAGES

BACKGROUND

1. Field

The described embodiments relate to electronic devices. More specifically, the described embodiments relate to the handling of push messages in electronic devices.

2. Related Art

Many modern electronic devices include a networking subsystem that is used for communicating with other electronic devices. For example, these electronic devices can include networking subsystem with a cellular network interface (EDGE, UMTS, HSDPA, LTE, etc.), a wireless network interface (e.g., a wireless network such as described in the Institute of Electrical and Electronics Engineers (IEEE) standards 802.11), and/or another type of wired or wireless interface. Some of these electronic devices support communication through a networking subsystem using a push message service. Push message services typically include a push server (or push servers) that can use a network connection (e.g., an internet protocol (IP) network connection) that is maintained between an electronic device and the push server to send push messages from the push server to the electronic device or to receive push messages (sometimes called "reverse" push messages) sent from the electronic device to the server. Push messages can include graphics, sounds, and/or text, and can be used to deliver various messages to electronic devices, e.g., news, stock quotes, weather forecasts, text messages, and/or notification of events such as email arrival.

For some applications, push message services are used to deliver push messages that include information that is timely, e.g., text messages, notifications, etc. However, push messages can sometimes be delayed as they are forwarded through the network. One source of delay for push messages is network hardware that buffers packets/data/messages sent from or destined to an electronic device until a given number of bytes have been received (or until a timeout has occurred) before forwarding the packets/data/messages. Because push messages may only include a small number of bytes, and because the electronic device may not be sending/receiving much additional traffic through the network connection as push messages are being sent/received, the number of bytes sent/received using the network connection may not be large enough to cause the network hardware to forward buffered packets, leading to delays in the delivery of push messages. Using the reverse push message as an example, the delay can occur both as the device sends a push message to the server or as the server communicates an acknowledge message after successfully receiving a push message from an electronic device. Because the delivery of the information in the push message is not timely, these delays in the delivery of push messages can be a source of user dissatisfaction.

SUMMARY

The described embodiments include an electronic device that handles push messages. In the described embodiments, the electronic device sends a push message to another electronic device, and one of the push message or an acknowledge message sent from the other electronic device to the electronic device in response to receiving the push message is buffered in network hardware on a network connection between the electronic device and the other electronic device and is not forwarded because less than a threshold amount of data has been buffered in the network hardware. When an acknowledge message has not been received from the other electronic device within a first predetermined time, the electronic device sends at least one dummy packet to the other electronic device, and at least one of the dummy packet or a corresponding response packet sent from the other electronic device to the electronic device in response to receiving the dummy packet is buffered in the network hardware, causing an amount of buffered data in the network hardware to exceed the threshold amount of data so that the buffered push message or acknowledge message is forwarded.

In some embodiments, when sending the at least one dummy packet to the other electronic device, the electronic device sends a dummy packet to the other electronic device and then determines if the acknowledge message has been received within a second predetermined time. If not, the electronic device determines if a maximum number of dummy packets has been sent. When the maximum number of dummy packets has been sent, the electronic device performs an operation for handling a loss of the push message. Otherwise, when the maximum number of dummy packets has not been sent, the electronic device returns to the sending operation to send an additional dummy packet and again performs the subsequent operations.

In some embodiments, when performing the operation for handling the loss of the push message, the electronic device tears down a network connection between the electronic device and the other electronic device. The electronic device then reestablishes a network connection between the electronic device and the other electronic device, and uses the reestablished network connection to resend the push message.

In some embodiments, the first predetermined time is a time selected from a range of 5-60 seconds, and wherein the second predetermined time is a time selected from a range of 5-60 seconds.

In some embodiments, the electronic device dynamically configures at least one of the maximum number of dummy packets, the first predetermined time, or the second predetermined time.

In some embodiments, one of the electronic device or the other electronic device provides a push message service.

In some embodiments, when sending the at least one dummy packet to the other electronic device, the electronic device sends at least one of a keep-alive packet, a purpose-specific packet, or an existing packet that has been repurposed.

In some embodiments, when sending the at least one dummy packet, the electronic device sends two or more dummy packets, wherein the two or more dummy packets comprise two or more different types of dummy packet.

BRIEF DESCRIPTION OF THE FIGURES

In the figures, like reference numerals refer to the same figure elements.

DETAILED DESCRIPTION

Figure 1:
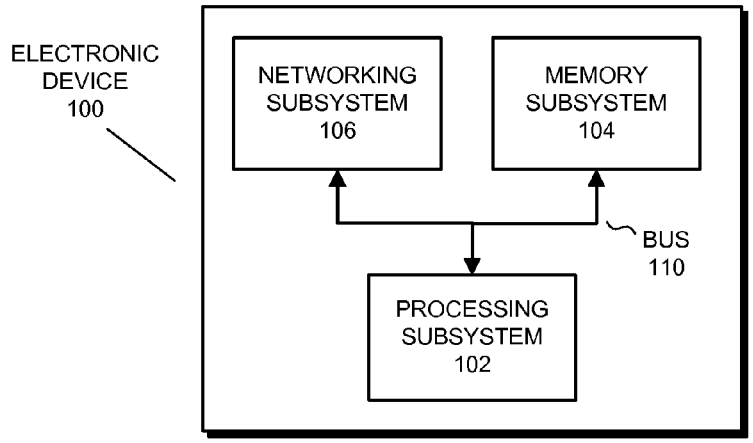
FIG. 1 presents a block diagram illustrating an electronic device in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in this detailed description can be included in hardware modules. For example, the hardware modules can include, but are not limited to, processing subsystems, microprocessors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of the embodiments.

Overview

In the described embodiments, an electronic device can send (reverse) push messages to and receive push messages from a push server when using a push message service. Generally, push messages can include graphics, sounds, and/or text, and can be used to deliver messages to and receive messages, e.g., news, stock quotes, weather forecasts, text messages, and/or notification of events such as email arrival or plays in an online game. An electronic device can receive a push message from the server and perform a corresponding action (e.g., display information/a message to a user, start/notify an application, etc.) and/or can send a (reverse) push message to the server for delivery to another electronic device (e.g., send a text message to a user of another electronic device, send a calendar update to a calendar application on a remote server, etc.).

In the described embodiments, network hardware (e.g., routers, switches, processors, etc.) in a network connection between an electronic device and a push server may buffer data until the buffered data reaches a certain threshold (e.g., number of bytes). Because push messages can include only a small number of bytes, and may be sent using a network connection that handles little or no additional traffic between the electronic device and the push server, push messages between the electronic device and the push server can be buffered in network hardware, and can remain buffered for a relatively long time (e.g., until a timeout is reached, which can be 1-5 minutes or more). For push messages for which such delays are noticeable, e.g., for a text message sent from one user to another using the push message service, such delays can lead to an unsatisfactory user experience.

However, and differently than existing systems, the described embodiments perform operations to enable push messages sent from a push server to an electronic device, and (reverse) push messages sent from an electronic device to a push server, to reach either the push server or the electronic device in a more timely way than in existing systems. For example, for reverse push messages, the described embodiments achieve this by, in the electronic device, waiting a predetermined time after the push message has been sent from the electronic device for an acknowledge message from the push server. If no acknowledge message is received from the push server in the predetermined time, it is presumed that the push message is buffered in network hardware somewhere between the electronic device and the push server, but that insufficient data has been buffered in the network hardware to cause the push message to be forwarded by the network hardware. The electronic device can therefore begin sending a given number of dummy packets to the push server at a predetermined interval. As the dummy packets are received by the network hardware, the amount of buffered data in the network hardware can increase beyond a buffering threshold for the network hardware, potentially causing the network hardware to forward the buffered push message (along with the dummy packets and any other buffered data). In this way, an electronic device can enable reverse push messages to reach the push server in a more timely way than in existing systems.

In some cases, the push server may actually have received the reverse push message and may have sent an acknowledge message to the electronic device. However, the electronic device may not have received the acknowledge message because the acknowledge message is buffered in network hardware somewhere between the push server and the electronic device (again because insufficient data has been buffered in the network hardware to cause the acknowledge message to be forwarded by the network hardware). This case appears the same as the case described above from the electronic device's perspective—in both cases, it is unclear what has happened with the push message. However, by sending the dummy packets, the electronic device can help cause network hardware to forward buffered acknowledge messages. Specifically, because receiving each dummy packet can cause the push server to send a response packet to the electronic device, the network hardware receives response packets sent from the push server. These response packets can cause the amount of buffered data in the network hardware to increase beyond a buffering threshold for the network hardware, thereby causing the network hardware to forward the buffered acknowledge message (along with the response packet(s) and any other buffered data).

In addition to the reverse push message, a push message sent in the other direction, i.e., from the push server to the electronic device, can be handled using the same technique. Specifically, the push server can send the dummy packets in the same way when a predetermined time passes after a push message is sent to the electronic device without receiving an acknowledge message from the electronic device, thereby potentially causing a buffered push message and/or acknowledge message to be forwarded from network hardware.

In the described embodiments, the dummy packets can be any packet that causes buffered data in network hardware to increase beyond the buffered data threshold so that buffered push messages are forwarded to the electronic device/server. In some embodiments, the dummy packets also cause a receiving device to send a response packet that causes buffered data in network hardware to increase beyond the buffered data threshold so that buffered acknowledge messages are forwarded to the electronic device/server. For example, in some embodiments, the dummy packet is a keep-alive packet, a purpose-specific packet, or another type of packet.

In some embodiments, if a given number of dummy packets are sent without receiving the acknowledge message, and/or or when a given number of response packets is received without receiving the acknowledge message (e.g., 1 response packet), it is presumed that the push message or the acknowledge message is not buffered in network hardware, and therefore sending additional packets will not cause the network hardware to forward the push message or acknowledge message. The electronic device/push server can then perform one or more operations for handling the loss of the push message.

In some embodiments, the network hardware is located in a cellular network. For example, the push server can be connected through a wide-area network (WAN) (e.g., the Internet or another WAN) to a cellular network, and the electronic device network device can be connected to the cellular network. In these embodiments, a cellular provider may have configured network hardware (routers, switches, processors, etc.) with the above-described buffering thresholds (possibly as a technique for avoiding extra power use by network devices and or mobile stations such as the electronic device).

Electronic Device

FIG. 1 presents a block diagram of an electronic device 100 in accordance with the described embodiments. Electronic device 100 includes processing subsystem 102, memory subsystem 104, and networking subsystem 106.

Processing subsystem 102 can include one or more devices configured to perform computational operations. For example, processing subsystem 102 can include, but is not limited to, one or more microprocessors, application-specific integrated circuits (ASICs), microcontrollers, digital signal processors, or programmable-logic devices.

Memory subsystem 104 can include one or more devices (e.g., computer-readable storage mediums) for storing data and/or instructions for processing subsystem 102 and networking subsystem 106. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for electronic device 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for often-used data, while the mass-storage device is used to store less frequently used data.

Networking subsystem 106 can include one or more devices configured to couple to and communicate on a wired and/or wireless network (i.e., to perform network operations). For example, networking subsystem 106 can include, but is not limited to, a Bluetooth networking system, a cellular networking system (e.g., EDGE, UMTS, HSDPA, LTE, etc.), or a networking system based on the standards described in IEEE 802.11 (e.g., an 802.11 wireless network), an Ethernet networking system, or a telephone networking system.

Networking subsystem 106 can include controllers, radios/antennas for wireless network connections, sockets/plugs for hard-wired electrical connections, and/or other devices used for coupling to, communicating on, and handling data and events on a wired and/or wireless network. In the following description, we refer to a subset of the mechanisms used for coupling to, communicating on, and handling data and events on the network at the physical layer of each network connection collectively as the "interface" for the corresponding network connection.

Within electronic device 100, processing subsystem 102, memory subsystem 104, and networking subsystem 106 are coupled together using bus 110. Bus 110 can be, e.g., an electrical, electro-optical, and/or optical connection that processing subsystem 102, memory subsystem 104, and networking subsystem 106 can use to communicate commands and data to each other. Although bus 110 is shown for clarity, different embodiments can include a different number and/or configuration of busses. Generally, electronic device 100 comprises sufficient busses to enable processing subsystem 102, memory subsystem 104, and networking subsystem 106 to communicate with one another.

Electronic device 100 can be, or can be incorporated into, many different types of electronic devices. For example, electronic device 100 can be or can be incorporated in a desktop computer, a laptop computer, a server, a media player, an appliance, a subnotebook/netbook, a tablet computer, a smart-phone, a piece of testing equipment, a network appliance, a set-top box, a personal digital assistant (PDA), a toy, a controller, or another device.

Although we use specific components to describe electronic device 100, in alternative embodiments, different components and/or subsystems may be present in electronic device 100. For example, electronic device 100 may include one or more additional processing subsystems 102, memory subsystems 104, and/or networking subsystems 106. Alternatively, one or more of the subsystems may not be present in electronic device 100. Moreover, although separate subsystems are shown in FIG. 1, in some embodiments, some or all of a given subsystem can be integrated into one or more of the other subsystems in electronic device 100. What's more, in some embodiments, electronic device 100 includes one or more additional subsystems that are not shown in FIG. 1. For example, electronic device 100 can include, but is not limited to, a data collection subsystem, a display subsystem, and/or an input/output (I/O) subsystem. In some embodiments, electronic device 100 includes one or more batteries (not shown) that provide power for electronic device 100.

Network Environment

Figure 2:
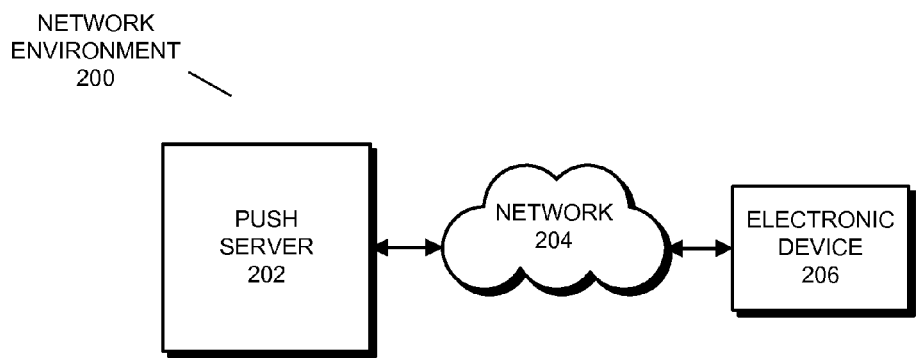
FIG. 2 presents a block diagram illustrating a network environment in accordance with the described embodiments.

FIG. 2 presents a block diagram illustrating a network environment 200 in accordance with the described embodiments. As can be seen in FIG. 2, push server 202 and electronic device 206 are coupled to network 204.

Network 204 can be any network or combination of networks that enables communication of data (data packets, control packets, etc.) between devices coupled to network 204, including the communication of push messages and acknowledge messages for a push message service. For example, network 204 can comprise a cellular network (e.g., EDGE, UMTS, HSDPA, LTE, etc.), a network based on the standards described in IEEE 802.11 (e.g., an 802.11 wireless network), an optical network, an Ethernet network, a wired telephone network, and/or other types or combinations of wired and/or wireless networks. In some embodiments, network 204 at least in part includes the Internet, a wide area network (WAN), a corporate or governmental intranet, and/or another larger network.

In the described embodiments, network 204 comprises network hardware that can be configured so that packets/data received from a given source are buffered until a buffering threshold has been met, at which time the buffered packets are forwarded to their intended destination(s). For example, in some embodiments, network 204 comprises network hardware such as switches, routers, memories/queues/buffers, network processors, controllers, etc. that can be configured to buffer (i.e., store) packets received from push server 202 and/or electronic device 206 in a transmit queue or another memory until a buffering threshold such as 640 bytes, 1024 bytes (1 kb), 2 kb, etc. is exceeded before forwarding/transmitting the packets to their intended destination(s). Recall that, in existing systems, the buffering of packets in network 204 can cause push messages and/or acknowledge messages (possibly in addition to other packets) to be held up in network 204 so that the push messages and/or acknowledge messages do not reach their destinations in a timely manner. However, the described embodiments use dummy packets to cause the network hardware to forward push messages and/or acknowledge messages in a more timely manner.

Figure 3:
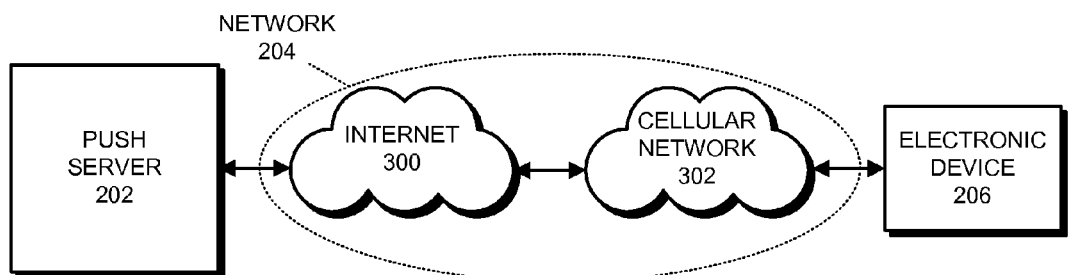
FIG. 3 presents a block diagram illustrating a network in accordance with the described embodiments.

In some embodiments, network 204 comprises a cellular network that is coupled through the Internet to push server 202 (i.e., network 204 comprises a combination of the cellular network and the Internet), with electronic device 206 coupled to the cellular network. FIG. 3 presents a block diagram illustrating this embodiment of network 204 where network 204 comprises Internet 300 and cellular network 302 in accordance with the described embodiments. In these embodiments, the network hardware that can be configured so that packets/data received from a given source are buffered until a buffering threshold has been met can be located in the cellular network 302.

In some embodiments, the network hardware (e.g., switches, routers, memories/queues/buffers, network processors, controllers, etc.) in cellular network 302 is located at least partially in one or more cellular traffic routing/control mechanisms in cellular network 302. For example, cellular network 302 can include, but is not limited to, a base station controller (BSC), a base station subsystem (BSS), a mobile switching center (MSC), a network station subsystem (NSS), one or more cell towers including antennas and processing hardware, and/or other routing/control mechanisms, and any or all of these routing/control mechanisms can perform the herein-described buffering of packets.

Although this arrangement of network 204 is presented as an example, in alternative embodiments, network 204 can include other types or arrangements of networks. Additionally, in some embodiments, the network hardware can be located on the Internet 300, or can be located in both cellular network 302 and the Internet 300.

In some embodiments, one or both of push server 202 and electronic device 206 include the subsystems similar to those shown in electronic device 100. However, push server 202 and electronic device 206 may comprise different numbers or types of subsystems.

In some embodiments, electronic device 206 is smaller form-factor and possibly portable electronic device such as a smart phone, a tablet computer, a laptop, a netbook, or a desktop computer. In some embodiments, electronic device 206 includes the subsystems similar to those shown in electronic device 100. However, electronic device 206 may comprise different numbers or types of subsystems.

In some embodiments, push server 202 is an electronic device such as a server, a server blade mounted in a rack system, or a desktop computer, or some combination of device. In some embodiments, push server 202 includes the subsystems similar to those shown in electronic device 100. However, push server 202 may comprise different numbers or types of subsystems.

Push Message Service

In the described embodiments, push server 202 provides some or all of the functions of a push message service. Generally, the push message service provided by push server 202 is a service that enables electronic devices (including push server 202 itself) to communicate push messages to one another.

Push server 202 can use a network connection (e.g., an IP network connection) that is maintained using network 204 between electronic device 206 and push server 202 to send push messages from the push server to the electronic device or to receive reverse push messages sent from the electronic device to the server. Push messages can include graphics, sounds, and/or text, and can be used to deliver various messages to electronic devices, e.g., news, stock quotes, weather forecasts, text messages, and/or notification of events such as email arrival, moves in a video game, etc.

In the described embodiments, electronic device 206 can receive a push message from push server 202 and perform a corresponding action (e.g., display information/a message to a user, start/notify an application, etc.) and/or can send a push message to push server 202 for delivery to another electronic device (e.g., send a text message to a user of another electronic device, send a calendar update to a calendar application on a remote server, etc.) (for clarity, the other electronic device is not shown). Aside from the aspects herein described, push services are known in the art and hence are not described in detail.

Operating System and Push Service Daemon

Figure 4:
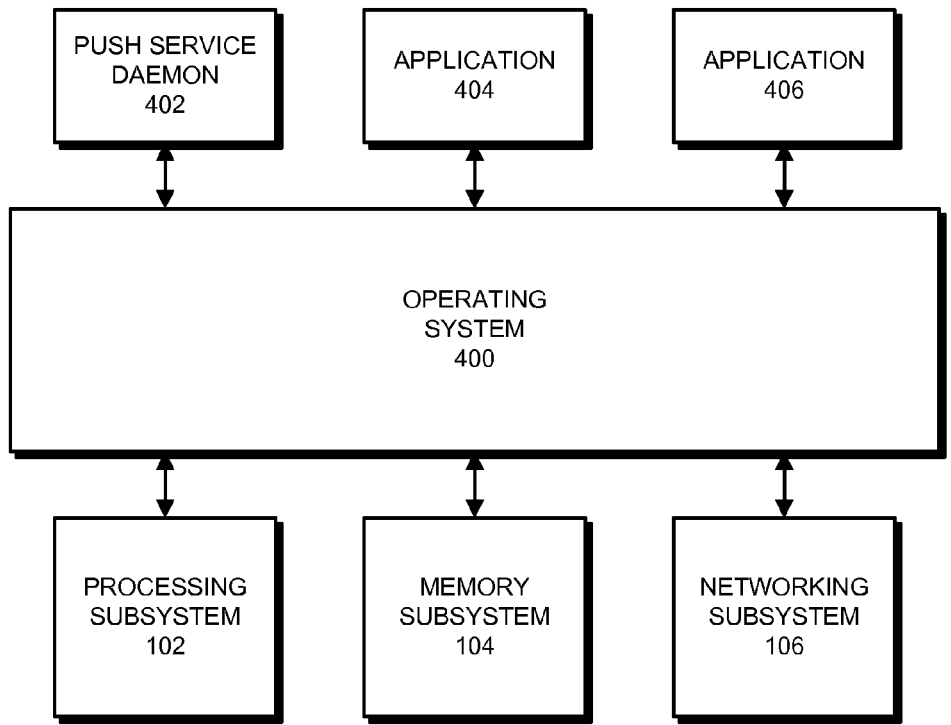
FIG. 4 presents a block diagram illustrating an operating system and a set of applications in accordance with the described embodiments.

FIG. 4 presents a block diagram illustrating an operating system 400 in accordance with the described embodiments. In some embodiments, operating system 400 is stored (as program code) in memory subsystem 104 and executed by a processing subsystem 102 in electronic device 206 (recall that, in some embodiments, electronic device 206 can include subsystems such as shown in electronic device 100).

Generally, operating system 400 serves as an intermediary between system hardware in electronic device 206 (e.g., subsystems 102-106) and applications and daemons executed by processing subsystem 102, such as applications 404-406 (which can be, for example, an instant messaging application and a game application) and push service daemon 402. Operating system 400 can be, but is not limited to being, the OS X operating system from Apple Inc. of Cupertino, Calif.; the FreeBSD operating system from The FreeBSD Foundation of Boulder, Colo.; or another operating system. Operating systems and their general functions are known in the art and hence are not described in detail.

To manage the transfer of packets to and from applications in electronic device 100 using an appropriate interface in networking subsystem 106, operating system 400 maintains one or more network protocol stacks (not shown) that each includes a number of logical layers. For example, the operating system can maintain an Internet protocol stack, which includes the link, Internet, transport, and application layers. As another example, the operating system can maintain a protocol stack based on the OSI model, which includes the application, presentation, session, transport, network, data-link, and physical layers. At corresponding layers of the protocol stack, the operating system includes control mechanisms and data structures for performing the functions associated with the layer. The functions associated with each of the layers in the protocol stacks are known in the art and hence are not described in detail.

Push service daemon 402 is a software mechanism that is executed by processing subsystem 102 to enable the use of a push message service on electronic device 206. Generally, push service daemon 402 handles the processing of push messages received by electronic device 206 (that may first be processed by operating system 400 in a corresponding network protocol stack) and the forwarding of push messages from agents (e.g., applications 404 and 406) on electronic device 206. For example, when application 404 is to send a reverse push message from electronic device 206 to push server 202, application 404 generates an internal message for push service daemon 402 that indicates parameters of the push message (e.g., a content of the message, a target, etc.) and sends the internal message to push service daemon 402. Push service daemon 402 receives the internal message and uses content from the internal message to generate a push message to be sent to push server 202. Push service daemon 402 then forwards the push message to operating system 400 to be processed in the network protocol stack and forwarded on the appropriate network interface to network 204, destined for push server 202. As described below, push service daemon 402 also includes mechanisms (e.g., monitoring mechanism 500) to enable reverse push messages sent from electronic device 206 to push server 202 to reach push server 202 in a more timely manner than in existing systems.

Note that, although push service daemon 402 is described with respect to electronic device 206, in the described embodiments, push server 202 can include an operating system 400, and can include an equivalent of push service daemon 402. However, because push server 202 in some embodiments serves as a push message service server, and therefore must handle significant volumes of traffic (e.g., incoming and outgoing push messages, control packets, etc.), push server 202 can include different numbers and/or types of mechanisms/programs/etc. for managing and controlling the push messaging service. As described herein, the mechanisms/programs/etc. in push server 202 can function in a similar way to push service daemon 402.

Handling Reverse Push Messages in an Electronic Device

Figure 5:
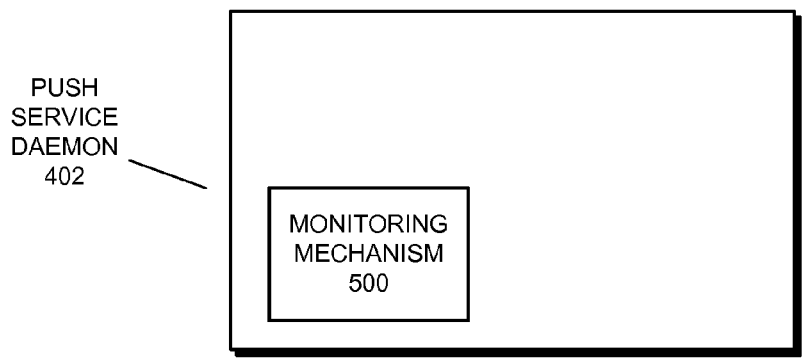
FIG. 5 presents a block diagram illustrating a push service daemon that includes a monitoring mechanism in accordance with the described embodiments.

In some embodiments, push service daemon 402 in electronic device 206 includes a monitoring mechanism 500 that performs at least some of the operations to enable reverse push messages sent from electronic device 206 to push server 202 to reach push server 202 in a more timely manner than in existing system. FIG. 5 presents a block diagram illustrating push service daemon 402 including monitoring mechanism 500 in accordance with the described embodiments. Monitoring mechanism 500 is a software mechanism executed by processing subsystem 102 in electronic device 206.

Note that, although push service daemon 402 and/or monitoring mechanism 500 are shown in a particular arrangement, in some embodiments, some or all of the functions performed by push service daemon 402 and monitoring mechanism 500 can be performed by other mechanisms. In some embodiments, some or all of push service daemon 402 and/or monitoring mechanism 500 are embodied in hardware mechanisms (e.g., ASICs, processors, etc.). When activated, the hardware mechanisms perform the operations herein described.

In the described embodiments, after push service daemon 402 sends a reverse push message to operating system 400 for forwarding on an appropriate network interface to push server 202, monitoring mechanism 500 monitors for the return of a corresponding acknowledge message from push server 202 in response to the reverse push message for a predetermined time, e.g., 10 seconds, 20 seconds, 1 minute, or another predetermined time. If the acknowledge message is not received from push server 202 in the predetermined time, it is possible and presumed that: (1) the reverse push message is buffered in network hardware somewhere in network 204 between electronic device 206 and push server 202 or (2) the acknowledge message is buffered in network hardware somewhere in network 204 between push server 202 and electronic device 206, but that insufficient data has been buffered in the network hardware to cause the reverse push message or the acknowledge message to be forwarded by the network hardware. It is further presumed that, absent the network hardware receiving more packets/data, the reverse push message or the acknowledge message will remain buffered in network hardware and will not be forwarded until a timeout or another event occurs at the network hardware, which could take an extended time, e.g., 1-5 minutes, to occur.

Figure 6A:
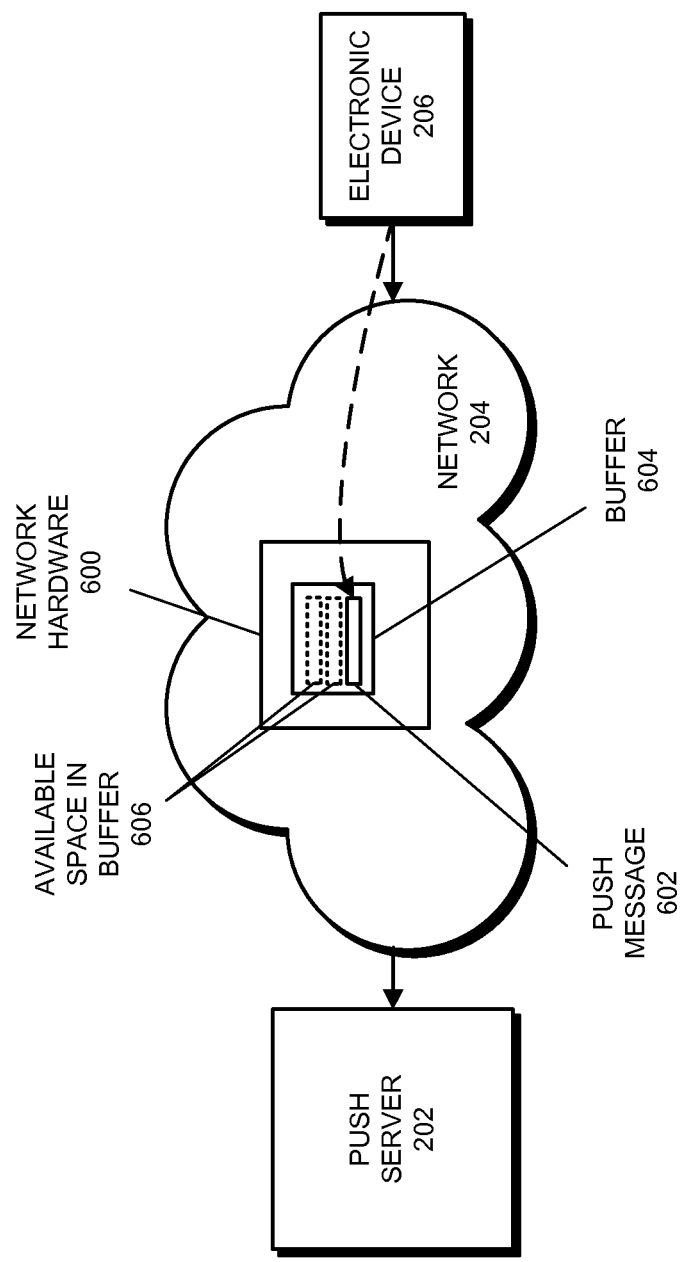
FIG. 6A presents a block diagram illustrating network hardware with a buffered push message in accordance with the described embodiments.

FIG. 6A presents a block diagram illustrating network hardware with a buffered push message in accordance with the described embodiments. As can be seen in FIG. 6A, reverse push message 602 was sent from electronic device 206 to network 204 destined for push server 202, but push message 602 is buffered in buffer 604 in network hardware 600 in network 204 (i.e., between electronic device 206 and push server 202). In the example shown in FIG. 6A, push message 602 has not been forwarded because insufficient data/packets/messages have been buffered in network hardware 600 to cause push message 602 to be forwarded by network hardware 600 to push server 202, as is shown by available space in buffer 606.

Figure 6B:
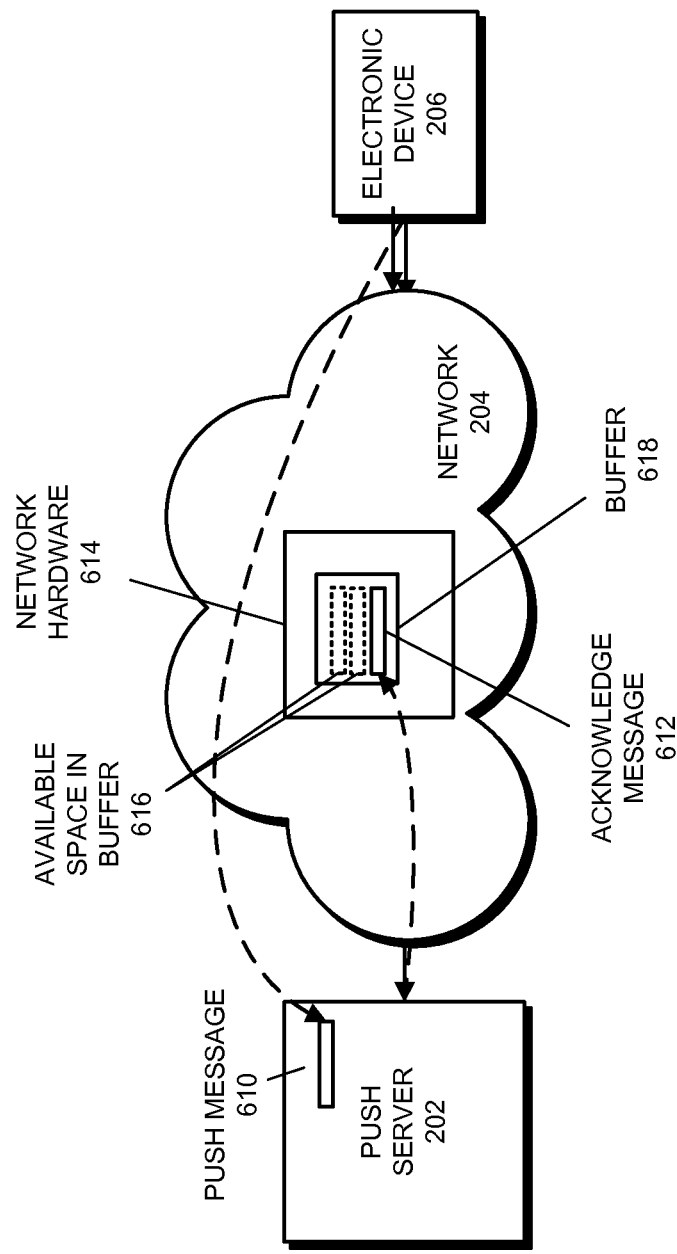
FIG. 6B presents a block diagram illustrating network hardware with a buffered acknowledge message in accordance with the described embodiments.

FIG. 6B presents a block diagram illustrating network hardware with a buffered acknowledge message in accordance with the described embodiments. As can be seen in FIG. 6B, reverse push message 610 was sent from electronic device 206 to network 204 and eventually reached push server 202. However, acknowledge message 612 sent by push server 202 to electronic device 206 in response to push message 610 is buffered in buffer 618 in network hardware 614 in network 204 (i.e., between push server 202 and electronic device 206), and has not been forwarded because insufficient data/packets/ messages have been buffered in network hardware 614 to cause acknowledge message 612 to be forwarded by network hardware 614 to electronic device 206, as is shown by available space in buffer 606.

Note that, in some embodiments, network hardware 600 and/or network hardware 614 can distinguish data/packets/ messages sent by a given device from data/packets/messages sent by other devices, and may buffer data/packets/messages sent by the given device until sufficient data has been sent from the given device to cause network hardware 600 and/or 614 to forward buffered data/packets/messages, possibly while continuing to forward data/packets/messages received from other devices.

As described above, network hardware 600 and network hardware 614 can be switches, routers, memories/queues/ buffers, network processors, controllers, etc. in network 204 that can be configured to store packets received from push server 202 and/or electronic device 206 in buffer/queue (e.g., buffer 618 in network hardware 614) or another memory until a buffering threshold such as 50 bytes, 640 bytes, 1024 bytes (1 kb), etc. is exceeded before forwarding/transmitting the packets to their intended destination(s). Note that network hardware 600 and network hardware 614 may be, but are not necessarily, the same network hardware.

Returning to the operations of monitoring mechanism 500—when monitoring mechanism 500 has determined that no acknowledge message has been received within the predetermined time, monitoring mechanism 500 sends one or more dummy packets from electronic device 206 to push server 202. The dummy packets are sent in a predetermined pattern from electronic device 206. Generally, the pattern in which dummy packets are sent by electronic device is arranged to cause the forwarding of the presumably buffered push message without also unnecessarily congesting the network. For example, in some embodiments, monitoring mechanism can send one dummy packet every 5-10 seconds for 20-60 seconds, or until the acknowledge message is received in electronic device 206.

When a dummy packet is sent, a number of outcomes can occur: (1) the dummy packet can be buffered in network hardware 600 before reaching push server 202, but may not cause the buffering threshold to be exceeded, meaning that the dummy packet is held in network hardware 600 (in the same manner as the push message); (2) the dummy packet can reach push server 202, causing push server 202 to send an response packet to electronic device, but the response packet can be buffered in network hardware 614 and may not cause the buffering threshold to be exceeded, meaning that the response packet is held in network hardware 614; or (3) the dummy packet and the response packet can both reach their respective destination, in which case, the acknowledge message has either reached electronic device 206, or the push message and/or the acknowledge message has been lost somewhere in network 204. Note that the second outcome above can mean that the dummy packet caused a push message buffered in network hardware 600 to be forwarded, but that both the acknowledge message and the response packet can be buffered on the return from push server 202. The first and second outcomes are why electronic device 206 sends multiple dummy packets (at the above-described interval) because the dummy packet and/or the response packet can be buffered in network hardware 600 and 614 (potentially in addition to the push message or the acknowledge message). However, as each dummy packet is received by network hardware 600 or as each response packet is received by network hardware 614, the amount of buffered data in the network hardware can increase beyond a buffering threshold for the network hardware, causing the network hardware to forward the buffered reverse push message and/or the acknowledge message (along with the response packets and any other buffered data).

Figure 7A:
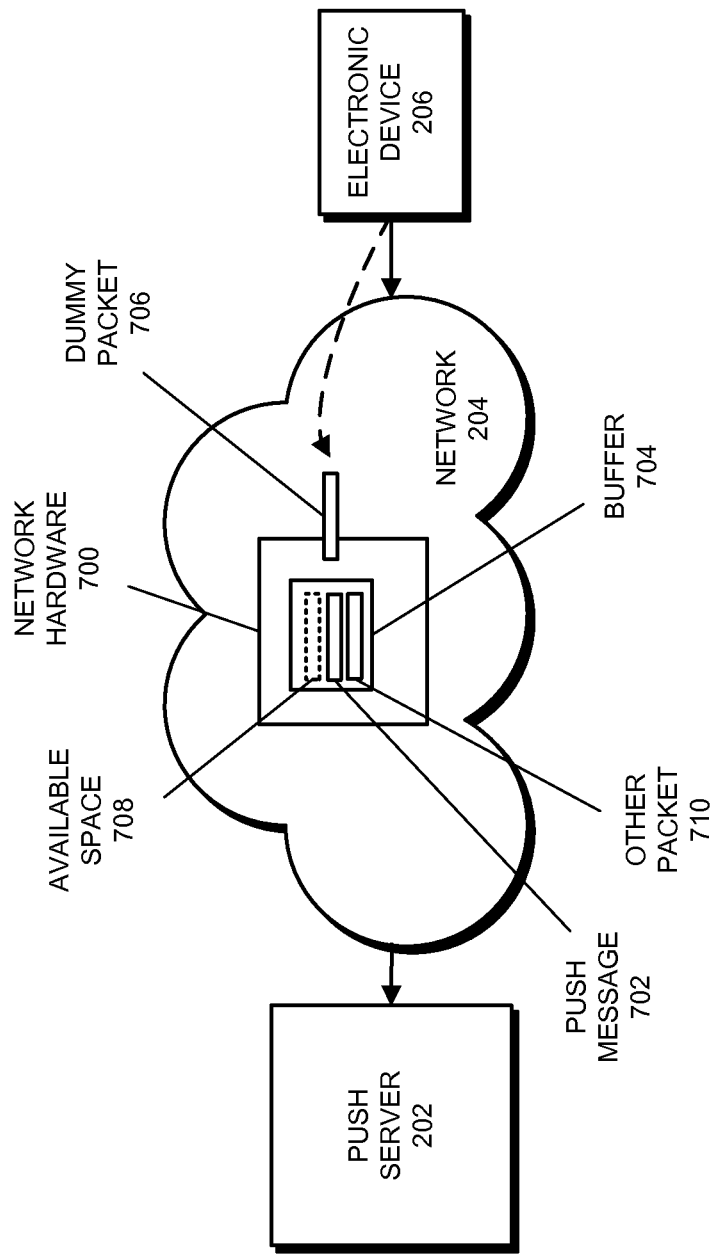
FIG. 7A presents a block diagram illustrating using a dummy packet to cause network hardware to forward a push message in accordance with the described embodiments.

FIG. 7A presents a block diagram illustrating a process for using a dummy packet to cause network hardware to forward a push message in accordance with the described embodiments. In FIG. 7A, electronic device 206 sent reverse push message 702 to network 204 destined for push server 202, but, because the buffering threshold in network hardware 700 has not been exceeded, push message 702 is buffered in buffer 704 and has not been forwarded to push server 202. Hence, push message 702 has not been received by push server 202, and push server 202 has not sent an acknowledge packet to electronic device 206.

After a predetermined time (e.g., 20 seconds, 36 seconds, or another time) had passed after sending push message 702 without receiving an acknowledge message from push server 202, monitoring mechanism 500 in electronic device 206 determined that no acknowledge message was received. Monitoring mechanism 500 therefore sent dummy packet 706 to push server 202. As can be seen in FIG. 7A, the available space 708 in buffer 704 is limited because push message 702 and other packet 710 are already stored in buffer 704. Consequently, for this example, it is assumed that buffering dummy packet 706 in buffer 704 will cause the buffering threshold in network hardware 700 to be exceeded. Because receiving dummy packet 706 causes the buffering threshold in network hardware 700 to be exceeded, network hardware 700 begins forwarding push message 702, dummy packet 706, and other packet 710 from buffer 704 to push server 202.

Figure 7B:
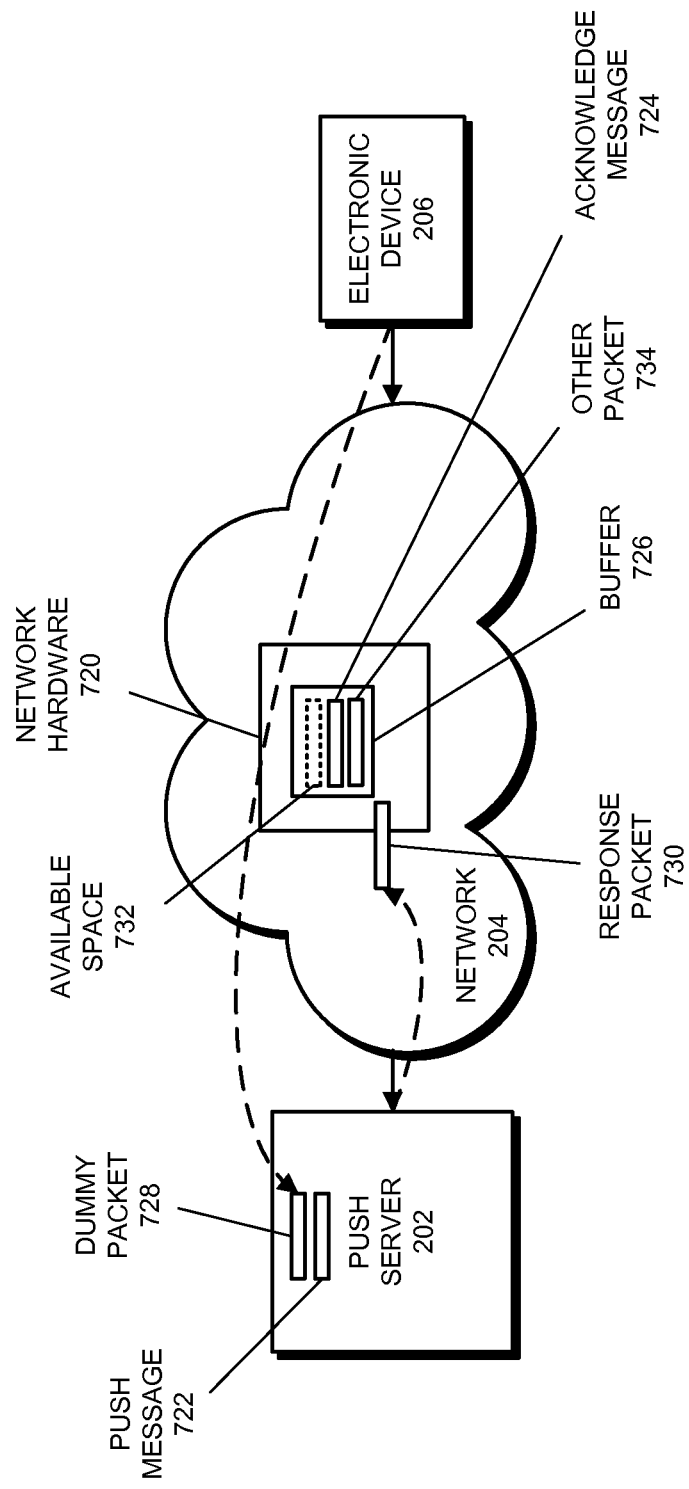
FIG. 7B presents a block diagram illustrating using a dummy packet to cause network hardware to forward an acknowledge message in accordance with the described embodiments.

Note that, although exemplary other packet 710 is shown in FIG. 7A (and other packet 734 is shown in FIG. 7B), other packets may not be necessary in order for the dummy packet to cause the buffering threshold to be exceeded. In the described embodiments, as few as the original push message and the dummy packet can be sufficient to exceed the buffering threshold.

FIG. 7B presents a block diagram illustrating a process for using a dummy packet to cause network hardware to forward an acknowledge message in accordance with the described embodiments. In FIG. 7B, electronic device 206 sent reverse push message 722 to network 204 destined for push server 202. Push message 722 eventually reached push server 202, causing push server 202 to send acknowledge message 724 to electronic device 206. However, because the buffering threshold in network hardware 720 has not been exceeded, acknowledge message 724 is buffered in buffer 726 and has not been forwarded to electronic device 206. Hence, electronic device 206 has not received acknowledge message 724 from push server 202 in response to push message.

After a predetermined time (e.g., 15 seconds, 20 seconds, or another time) had passed after sending push message 722 without receiving an acknowledge message from push server 202, monitoring mechanism 500 in electronic device 206 determined that no acknowledge message was received.

Monitoring mechanism 500 therefore sent dummy packet 728 to push server 202. Dummy packet 728 proceeded through network 204 to be received by push server 202. In response to dummy packet 728, push server 202 sent response packet 730 to electronic device 206.

As can be seen in FIG. 7B, the available space 732 in buffer 726 is limited because acknowledge message 724 and other packet 734 are already stored in buffer 726. Consequently, for this example, it is assumed that buffering response packet 730 in buffer 726 will cause the buffering threshold in network hardware 720 to be exceeded. Because the buffering threshold is exceeded, network hardware 720 begins forwarding acknowledge message 724, response packet 730, and other packet 734 from buffer 704 to push server 202.

In the example shown in FIG. 7A, the receipt of dummy packet 706 causes network hardware 700 to forward buffered push message 702. Similarly, in the example shown in FIG. 7B, the receipt of response packet 730 causes network hardware 720 to forward buffered acknowledge message 724. In this way, by sending dummy packet 706/728, electronic device 206 in the described embodiments can have caused network hardware 700/720 to forward buffered push message 702 or buffered acknowledge message 724 significantly earlier than network hardware 700/720 might have otherwise forwarded buffered push message 702 or buffered acknowledge message 724 in existing systems. This can be true because the timeout for automatically sending buffered packets in network hardware 700 can be on the order of 1-5 minutes, whereas the predetermined time after which monitoring mechanism 500 in electronic device 206 begins sending dummy packets can be on the order of 10-20 seconds.

In the described embodiments, when a given number of dummy packets, e.g., 5, 8, or another number, is sent by monitoring mechanism 500 without electronic device 206 receiving an acknowledge message from push server 202, or when a given number of response packets is received without receiving the acknowledge message (e.g., 1 response packet), it is presumed that the push message and/or the acknowledge message is not buffered in network hardware—and so sending more dummy packets will not cause the network hardware to forward the buffered packets. In this case, in some embodiments, electronic device 206 can perform operations for handling the loss of the push message and/or the acknowledge message. For example, electronic device 206 can tear-down the network connection with push server 202 and reestablish the network connection. For example, in some cases, re-establishing the network connection comprises performing a TCP bring-up, IPsec, and/or other operations for establishing a network connection between electronic device 206 and push server 202. Electronic device 206 can then resend the push message.

In this way, the electronic device first attempts to handle the case where the push message or the acknowledge message is buffered in network hardware, but then proceeds as if the network connection has been lost. This is an improvement over existing systems that simply assume that the connection has been lost, and proceed with the immediate teardown and re-establishment of the network connection.

As described above, network hardware 700 and network hardware 720 can be switches, routers, memories/queues/buffers, network processors, controllers, etc. in network 204 that can be configured to store packets received from push server 202 and/or electronic device 206 in buffer/queue (e.g., buffer 726 in network hardware 720) or another memory until a buffering threshold such as 50 bytes, 640 bytes, 1024 bytes (1 kb), etc. is exceeded before forwarding/transmitting the packets to their intended destination(s). Note that network hardware 700 and network hardware 720 may be, but are not necessarily, the same network hardware.

Handling Push Messages in a Push Server

Although some operations performed by the described embodiments are described above using push service daemon 402 in electronic device 206, the described embodiments are not limited to electronic device 206 including a mechanism for performing the operations. In the some embodiments, push server 202 comprises a similar monitoring mechanism (not shown in the figures). In these embodiments, the monitoring mechanism in push server 202 can perform similar operations to the push service daemon 402 in electronic device 206. For example, the monitoring mechanism can be configured to monitor for acknowledge messages for a given timeout following the transmission of a push message from push server 202 to electronic device 206. When an acknowledge message is not received from electronic device 206 before the timeout expires, push server 202 can be configured to send dummy packets in an attempt to cause network hardware in network 204 in which the push message or the corresponding acknowledge message is presumed to be buffered to forward the buffered messages.

Dummy Packet and Response Packet

In the described embodiments, the dummy packets and/or response packets sent by electronic device 206 and push server 202 can include any type of packet or combination of packets that will add to an amount of data buffered in the network hardware in order to exceed a buffering threshold in the network hardware to cause the network hardware to forward a buffered push message and/or acknowledge message. In some embodiments, the dummy packet and/or response packet is selected to minimize the amount of network traffic necessary for sending the dummy packet and/or the response packet. In addition, in some embodiments, the dummy packet and/or response packet is selected to minimize the amount of processing necessary for handling the dummy packet and/or response packet in the sending and receiving devices.

In some embodiments, the dummy packet and response packet are compatible with one or more supported versions of the push message service to enable processing by the supported versions. For example, the dummy packet and/or response packet can be an existing packet that has been repurposed, a new custom/purpose-specific packet that can be handled by the supported versions (even if older supported versions may handle the packet differently than newer supported versions).

In the embodiments where the dummy packets and/or response packets include existing types of packets, the existing packets may have been designed for a particular uses in existing system, but may be repurposed in the described embodiments (i.e., used to cause networking hardware to exceed a buffering threshold, instead of a more common use). For example, in some embodiments, the dummy packet is an existing keep-alive packet that is sometimes also used to ensure that the network connection between the electronic device and the push server is kept open for the transmission of push messages. Note that the keep-alive packet may be configured with a shorter expected time for receiving a response, and may therefore cause the electronic device 206/push server 202 to time-out and tear down the connection sooner.

In some embodiments, one or more different types of packets can be used as dummy packets and/or response packets. For example, in some embodiments, depending on an amount of traffic that is being sent on the network connection, a larger (in terms of number of bytes) or smaller dummy packet and/or response packet can be sent. In some embodiments, the dummy packet can be selected to cause the responding electronic device to send a predetermined response packet, e.g., a response packet of a given size, etc.

In some embodiments, one or more dummy packet and/or response packets in a sequence of dummy packet and/or response packets can be a different format of packet and/or can be a larger (in terms of number of bytes) or smaller dummy packet and/or response packet. For example, assuming that 3 dummy packets are sent out in sequence, with one dummy packet being sent every 10 seconds (further assuming that the acknowledge packet is not received), the first dummy packet can be a smaller dummy packet, while the next dummy packet is slightly larger, and the third dummy packet is the largest of the dummy packets.

As another example, the first dummy packet can be a first format, the second can be a different format, and the third can be a third format. In some embodiments, the dummy packet and/or the response packet has an adjustable payload that can be configured as each dummy packet/response packet is sent.

In some embodiments, the dummy packet and/or the response packet can be configured to cause the network hardware to buffer a given amount of data, e.g., 1 kb, etc., as the dummy packet is processed in the network hardware, although the data may not be transmitted on the network (i.e., may not be part of the payload of the dummy packet or any other packet transmitted on the network). Alternatively, in some embodiments, the dummy packet and/or the response packet can be configured to cause the network hardware to immediately forward all buffered data for a corresponding device.

Process for Sending Dummy Packets

Figure 8:
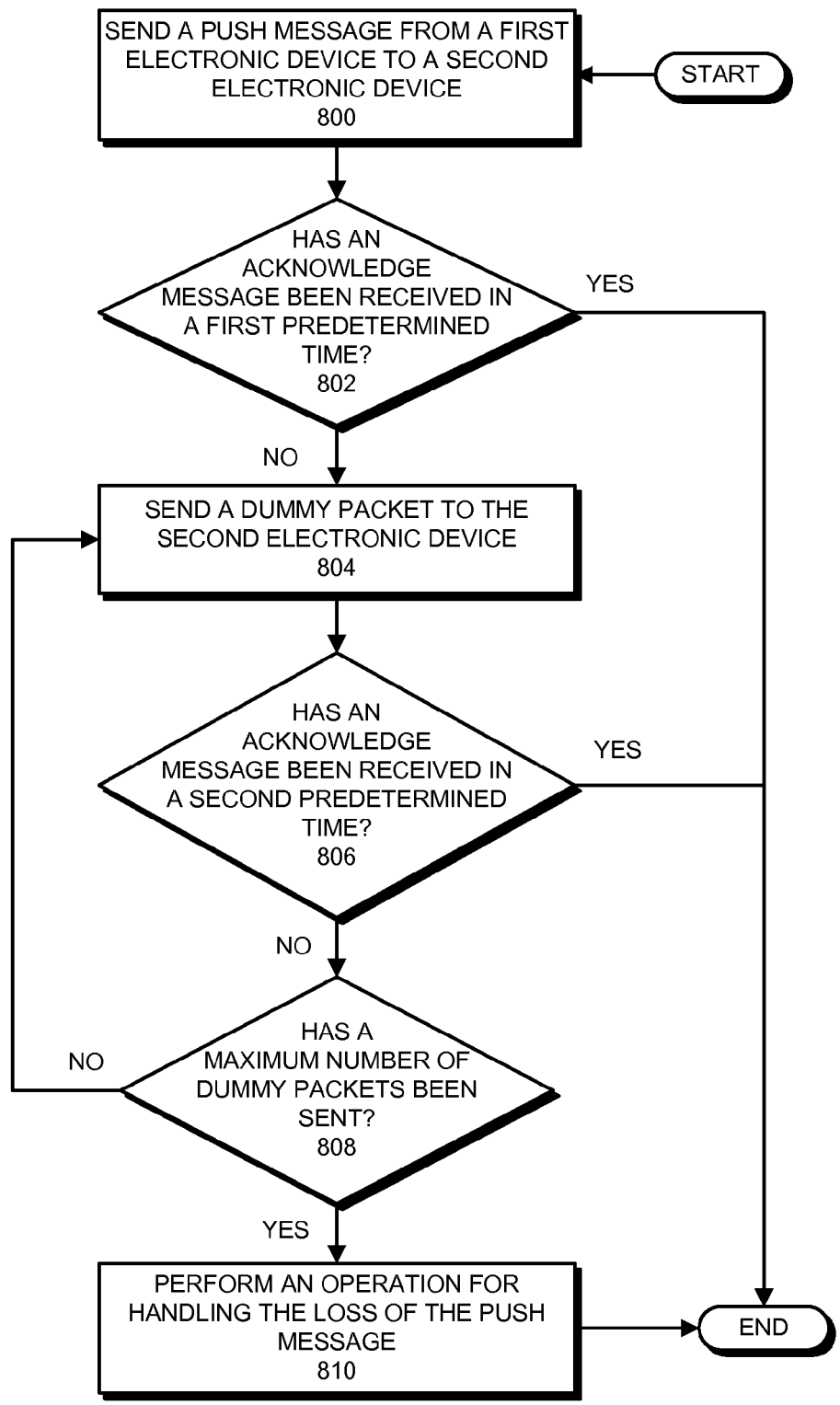
FIG. 8 presents a flowchart illustrating operations performed for sending dummy packets in accordance with the described embodiments.

FIG. 8 presents a flowchart illustrating operations performed for sending dummy packets in accordance with the described embodiments. As shown in FIG. 8, the process starts when a first electronic device sends a push message to a second electronic device (step 800). For example, push server 202 can send a push message to electronic device 206. As another example, electronic device 206 can send a reverse push message to push server 202. Generally, the push message can include any content allowed in a push message, including, but not limited to, news, weather forecasts, text messages, and/or notification of events. In the described embodiments, push messages can be sent by mechanisms such as push service daemon 402 in electronic device 206, or a similar mechanism in push server 202.

After sending the push message, the first electronic device monitors for the return of an acknowledge message from the second electronic device to determine if the acknowledge message has been received in a first predetermined time (step 802). For example, assuming that the first device is electronic device 206, monitoring mechanism 500 can record that the push message was sent at a given time $T_0$ and can set a timer for time $T_1$, which may be, e.g., 10 seconds, 20 seconds, or another time later. At the expiration of the timer, monitoring mechanism 500 can check to see if the acknowledge message has been received. In alternative examples, monitoring mechanism 500 can generally undertake any operations for monitoring for the receipt of an acknowledge packet in the predetermined time. In some embodiments, the first predetermined time is dynamically configurable in the first electronic device (based on, e.g., network congestion, average acknowledge message return time, response packet type, push server version, device load, etc.).

When the acknowledge message has been received in the first predetermined time (step 802), the process ends. Note that this outcome occurs when the push message proceeded through a network connection between the first electronic device and the second electronic device, and the corresponding acknowledge message proceeded through a network connection between the second electronic device and the first electronic device in a timely manner.

However, when the acknowledge message has not been received in the first electronic device, the first electronic device sends a dummy packet to the second electronic device (step 804). Recall that, when the acknowledge message has not been received, the described embodiments presume that either the push message or the corresponding acknowledge message has been buffered in network hardware, but that network hardware has not received sufficient packets/data/messages/etc. to cause the forwarding of the buffered push message or acknowledge message. The dummy packet is therefore intended to cause a buffering threshold to be exceeded in the network hardware so that the push message and/or the acknowledge message is forwarded from network hardware. Additionally recall that the dummy packet can be any packet that causes the forwarding of the push message and/or the acknowledge message from the corresponding network hardware, including a keep-alive packet, a dedicated (purpose-specific) packet, or another type of packet. In some embodiments, the type of dummy packet that is sent out is dynamically configurable in the first electronic device (based on, e.g., network congestion, average acknowledge message return time, response packet type, push server version, device load, etc.).

After sending the dummy packet, the first electronic device monitors for the return of acknowledge message from the second electronic device to determine if the acknowledge message has been received in a second predetermined time (step 806). In the described embodiments, the second predetermined time can be, but is not necessarily, different than the first predetermined time. For example, the second predetermined time can be 10 seconds, 20 seconds, 1 minute, or another time. In some embodiments, the second predetermined time is dynamically configurable in the first electronic device (based on, e.g., network congestion, average acknowledge message return time, response packet type, push server version, device load, etc.).

When the acknowledge message has been received in the second predetermined time (step 806), the process ends. Note that this outcome can occur when the push message was delayed, but eventually proceeded through a network connection between the first electronic device and the second electronic device, and the corresponding acknowledge message eventually proceeded through a network connection between the second electronic device and the first electronic device. This outcome can also occur when the dummy packet and/or the corresponding response packet caused the forwarding of the push message and/or the acknowledge message from the network hardware.

If the acknowledge message has not been received in the second predetermined time (step 806), the first electronic device determines if a maximum number of dummy packets has been sent (step 808). In the described embodiments, dummy packets can be sent every second predetermined time (e.g., 10 seconds, 20 seconds, 1 minute, or another time) until as many as N dummy packets have been sent. The value of N is configurable, but can be e.g., 3, 7, 13, or another value. For this example, it is assumed that the maximum number of dummy packets is 2. In some embodiments, the maximum number of dummy packets is dynamically configurable in the first electronic device (based on, e.g., network congestion, average acknowledge message return time, response packet type, push server version, device load, etc.).

Because only 1 dummy packet has been sent, the first electronic device determines that a maximum number of dummy packets has not been sent (step 808) and returns to step 804 to send a dummy packet to the second electronic device. After sending the dummy packet, the first electronic device again monitors for the return of acknowledge message from the second electronic device to determine if the acknowledge message has been received in a second predetermined time (step 806). When the acknowledge message has been received in the second predetermined time (step 806), the process ends. Note that this outcome can occurs when the push message was delayed, but eventually proceeded through a network connection between the first electronic device and the second electronic device, and the corresponding acknowledge message eventually proceeded through a network connection between the second electronic device and the first electronic device. This outcome can also occur when the first or second dummy packet and/or the corresponding first or second response packet caused the forwarding of the push message and/or the acknowledge message from the network hardware.

However, if the acknowledge message has not been received in the second predetermined time (step 806), the first electronic device determines if a maximum number of dummy packets has been sent (step 808). Because 2 dummy packets have been sent (which is an exemplary maximum number of dummy packets), the first electronic device determines that a maximum number of dummy packets has been sent (step 808), and performs an operation for handling the loss of the push message (step 810), after which the process ends. For example, in some embodiments the first electronic device can tear down or otherwise discard a network connection between the first electronic device and the second electronic device, can reestablish the network connection, and can resend the push message. As another example, the first electronic device can use one or more alternative routes for sending the push message, can perform one or more operations for determining if the network connection is still functioning, and/or can perform other operations for handling a lost push message.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for handling push messages, comprising:
in a first electronic device, performing operations for:
sending a push message to a second electronic device, wherein one of the push message or an acknowledge message sent from the second electronic device to the first electronic device in response to receiving the push message is buffered in network hardware on a network connection between the first electronic device and the second electronic device and is not forwarded because less than a threshold amount of data has been buffered in the network hardware; and
when an acknowledge message has not been received from the second electronic device within a first predetermined time, sending at least one dummy packet to the second electronic device, wherein at least one of the dummy packet or a corresponding response packet sent from the second electronic device in response to receiving the dummy packet is buffered in the network hardware, causing an amount of buffered data in the network hardware to exceed the threshold amount of data so that the buffered push message or acknowledge message is forwarded.

2. The method of claim 1, wherein sending the at least one dummy packet to the second electronic device comprises:
sending a dummy packet to the second electronic device;
determining if the acknowledge message has been received within a second predetermined time;
when the acknowledge message has not been received in the second predetermined time, determining if a maximum number of dummy packets has been sent; and
when the maximum number of dummy packets has been sent, performing an operation for handling a loss of the push message;
otherwise, when the maximum number of dummy packets has not been sent, returning to the sending operation to send an additional dummy packet and again performing the subsequent operations.

3. The method of claim 2, wherein performing the operation for handling the loss of the push message comprises:
tearing down a network connection between the first electronic device and the second electronic device;
reestablishing a network connection between the first electronic device and the second electronic device; and
resending the push message using the reestablished network connection.

4. The method of claim 2, wherein the first predetermined time is a time selected from a range of 5-60 seconds, and wherein the second predetermined time is a time selected from a range of 5-60 seconds.

5. The method of claim 2, further comprising:
dynamically configuring at least one of the maximum number of dummy packets, the first predetermined time, or the second predetermined time.

6. The method of claim 1, further comprising:
providing a push message service from one of the first electronic device or the second electronic device.

7. The method of claim 1, wherein sending the at least one dummy packet to the second electronic device comprises:
sending at least one of a keep-alive packet, a purpose-specific packet, or an existing packet that has been repurposed.

8. The method of claim 1, wherein sending the at least one dummy packet comprises:
sending two or more dummy packets, wherein the two or more dummy packets comprise two or more different types of dummy packet.

9. An electronic device that handles push messages, comprising:
the electronic device, wherein the electronic device:
sends a push message to another electronic device, wherein one of the push message or an acknowledge message sent from the other electronic device to the electronic device in response to receiving the push message is buffered in network hardware on a network connection between the electronic device and the other electronic device and is not forwarded because less than a threshold amount of data has been buffered in the network hardware; and
when an acknowledge message has not been received from the other electronic device within a first predetermined time, sends at least one dummy packet to the other electronic device, wherein at least one of the dummy packet or a corresponding response packet sent from the other electronic device to the electronic device in response to receiving the dummy packet is buffered in the network hardware, causing an amount of buffered data in the network hardware to exceed the threshold amount of data so that the buffered push message or acknowledge message is forwarded.

10. The electronic device of claim 9, wherein, when sending the at least one dummy packet to the other electronic device, the electronic device:
   sends a dummy packet to the other electronic device;
   determines if the acknowledge message has been received within a second predetermined time;
   when the acknowledge message has not been received in the second predetermined time, determines if a maximum number of dummy packets has been sent; and
   when the maximum number of dummy packets has been sent, performs an operation for handling a loss of the push message;
   otherwise, when the maximum number of dummy packets has not been sent, returns to the sending operation to send an additional dummy packet and again performs the subsequent operations.

11. The electronic device of claim 10, wherein, when performing the operation for handling the loss of the push message, the electronic device:
   tears down a network connection between the electronic device and the other electronic device;
   reestablishes a network connection between the electronic device and the other electronic device; and
   resends the push message using the reestablished network connection.

12. The electronic device of claim 10, wherein the first predetermined time is a time selected from a range of 5-60 seconds, and wherein the second predetermined time is a time selected from a range of 5-60 seconds.

13. The electronic device of claim 10, wherein the electronic device:
   dynamically configures at least one of the maximum number of dummy packets, the first predetermined time, or the second predetermined time.

14. The electronic device of claim 1, wherein one of the electronic device or the other electronic device provides a push message service.

15. The electronic device of claim 1, wherein, when sending the at least one dummy packet to the other electronic device, the electronic device sends at least one of a keep-alive packet, a purpose-specific packet, or an existing packet that has been repurposed.

16. The electronic device of claim 1, wherein, when sending the at least one dummy packet, the electronic device sends two or more dummy packets, wherein the two or more dummy packets comprise two or more different types of dummy packet.

17. A computer-readable storage medium storing instructions that, when executed by an electronic device with computing capabilities, cause the electronic device to perform a method for handling push messages, comprising:
   in the electronic device, performing operations for:
      sending a push message to another electronic device, wherein one of the push message or an acknowledge message sent from the other electronic device to the electronic device in response to receiving the push message is buffered in network hardware on a network connection between the electronic device and the other electronic device and is not forwarded because less than a threshold amount of data has been buffered in the network hardware; and
      when an acknowledge message has not been received from the other electronic device within a first predetermined time, sending at least one dummy packet to the other electronic device, wherein at least one of the dummy packet or a corresponding response packet sent from the other electronic device to the electronic device in response to receiving the dummy packet is buffered in the network hardware, causing an amount of buffered data in the network hardware to exceed the threshold amount of data so that the buffered push message or acknowledge message is forwarded.

18. The computer-readable storage medium of claim 17, wherein sending the at least one dummy packet to the other electronic device comprises:
   sending a dummy packet to the other electronic device;
   determining if the acknowledge message has been received within a second predetermined time;
   when the acknowledge message has not been received in the second predetermined time, determining if a maximum number of dummy packets has been sent; and
   when the maximum number of dummy packets has been sent, performing an operation for handling a loss of the push message;
   otherwise, when the maximum number of dummy packets has not been sent, returning to the sending operation to send an additional dummy packet and again performing the subsequent operations.

19. The computer-readable storage medium of claim 18, wherein performing the operation for handling the loss of the push message comprises:
   tearing down a network connection between the electronic device and the other electronic device;
   reestablishing a network connection between the electronic device and the other electronic device; and
   resending the push message using the reestablished network connection.

20. The computer-readable storage medium of claim 18, wherein the first predetermined time is a time selected from a range of 5-60 seconds, and wherein the second predetermined time is a time selected from a range of 5-60 seconds.

21. The computer-readable storage medium of claim 18, wherein the method further comprises:
   dynamically configuring at least one of the maximum number of dummy packets, the first predetermined time, or the second predetermined time.

22. The computer-readable storage medium of claim 17, wherein the method further comprises:
   providing a push message service from one of the electronic device or the other electronic device.

23. The computer-readable storage medium of claim 17, wherein sending the at least one dummy packet to the other electronic device comprises:
   sending at least one of a keep-alive packet, a purpose-specific packet, or an existing packet that has been repurposed.

24. The computer-readable storage medium of claim 17, wherein sending the at least one dummy packet comprises:
   sending two or more dummy packets, wherein the two or more dummy packets comprise two or more different types of dummy packet.

* * * * *